United States Patent [19]
Sutherland et al.

[11] 4,127,618
[45] Nov. 28, 1978

[54] MODIFIED VINYL CHLORIDE POLYMERS

[75] Inventors: Thomas H. Sutherland, Sarnia; Peter A. C. Smith, Petrolia, both of Canada

[73] Assignee: Exxon Research & Engineering Co., Florham Park, N.J.

[21] Appl. No.: 763,648

[22] Filed: Jan. 28, 1977

Related U.S. Application Data

[63] Continuation of Ser. No. 585,967, Jun. 11, 1975, which is a continuation of Ser. No. 403,783, Oct. 5, 1973, Pat. No. 3,862,943, which is a continuation-in-part of Ser. No. 203,029, Nov. 29, 1971, which is a continuation-in-part of Ser. No. 102,939, Dec. 30, 1970, abandoned.

[51] Int. Cl.$^2$ .................... C08F 279/00; C08F 279/02
[52] U.S. Cl. .................................................... 260/879
[58] Field of Search ........................................ 260/879

[56] References Cited

U.S. PATENT DOCUMENTS

| 3,557,253 | 1/1971 | Sugimoto et al. | 260/879 X |
| 3,562,358 | 2/1971 | Gelman | 260/879 |
| 3,629,369 | 12/1971 | Lalet et al. | 260/879 |

FOREIGN PATENT DOCUMENTS 1,385,548  1/1965  France ................................. 260/879

Primary Examiner—William F. Hamrock
Attorney, Agent, or Firm—M. B. Kurtzman

[57] ABSTRACT

The impact strength of rigid vinyl halide polymers is greatly improved by graft blending therewith up to 50 parts by weight of a butyl rubber composition per hundred parts of vinyl chloride monomer. The graft blends are prepared by polymerizing vinyl chloride monomer in the presence of the butyl rubber by suspension polymerization. This impact enhancement is not gained at the expense of other properties, e.g., processability.

10 Claims, No Drawings

MODIFIED VINYL CHLORIDE POLYMERS

CROSS-REFERENCES

This is a continuation of application Ser. No. 585,967, filed June 11, 1975, which is a continuation of Ser. No. 403,783, filed Oct. 5, 1973 now U.S. Pat. No. 3,862,943, which is a continuation-in-part of copending application Ser. No. 203,029, filed Nov. 29, 1971, which in turn is a continuation-in-part of application Ser. No. 102,939, filed Dec. 30, 1970, now abandoned.

BACKGROUND OF THE INVENTION

It is well known that vinyl halide, and particularly vinyl chloride polymers are used quite extensively in extruded profiles, molded objects, sheets, films and coatings and it is often desirable to attempt to increase impact strengths for these polymers. One approach taken to achieve better processability has been to blend plasticizing agents into the vinyl halide polymer. However, such blending often results in decreased tensile strength, less resistance to solvents, poor high temperature properties, etc.

Alternative approaches have included incorporating minor amounts of elastomeric materials into the vinyl halide polymer. A major drawback of this technique has been that most elastomers are incompatible with vinyl halide polymers, with the result being that mixing conditions must be quite vigorous and only a very weak mechanical mixture is obtained. For instance, the mixing of any rubber into PVC resins requires very robust equipment such as a Banbury Mixer or a two-roll rubber mill. The product from such equipment cannot be easily fed to an extruder for fabrication of a final product (e.g., a rigid profile) but must be further cut or diced to a convenient size.

To alleviate this problem, elastomers such as butadiene-acrylonitrile copolymers, chlorinated or brominated butyl rubbers, etc. (see, e.g., U.S. Pat. Nos. 3,090,768 and 3,424,818), which contain functional groups capable of enhancing compatibility, have been utilized with varying degrees of success.

In an attempt to prepare mixtures of vinyl chloride polymer and butyl rubber (an elastomer lacking compatibility-enhancing functional groups), it was reported in U.S. Pat. No. 3,158,664 that although impact strengths were appreciably increased (a maximum impact strength of 14.0 ft-lb/inch of notch was reported), considerably longer periods of time were required to produce these mixtures on a mill than were required for mixtures of vinyl chloride polymers with elastomers containing compatibility-enhancing functional groups such as butadiene-acrylonitrile.

In any case, such mixing operations generally require quite high proportions of elastomers in order to attain enhanced impact strength and quantities in excess of 15% are normal. Further, such properties as stability, chemical resistance, finished appearance, and the ability to rework scrap all suffer to varying degrees. The growth of new applications and the continuous competitive nature of the industry have spotlighted the drawbacks of these methods and promoted interest in reducing their shortcomings.

The best approach to overcome the inherent disadvantages due to incompatibility in combining vinyl halide polymers with elastomers has been to graft a substantial portion of the vinyl halide polymer to an elastomeric backbone. For instance, U.S. Pat. No. 3,629,369 teaches grafting of greater than 75% of the chlorinated butyl rubber by the vinyl chloride monomer. Very energetic free radical initiators are required. By this technique, a graft blend polymer is created, with the grafted portion providing increased compatibility for the two homopolymer species. Polymers which have been employed in combination with polyvinyl chloride in preparing these graft polymers include polyethylene, copolymers of ethylene and high alpha olefins (EPR's), terpolymers of ethylene, higher alpha olefins and minor amounts of dienes (EPDM's), and chlorinated butyl rubber. See, for example, U.S. Pat. No. 3,408,424, British Pat. Nos. 1,097,020, 1,504,062, 1,070,297, and U.S. Pat. No. 3,629,369. It is apparent that the graftable substrates cited contain readily accessible graft-sites, e.g., high degree of unsaturation, or labile groups known to facilitate grafting, e.g., chlorine, thiols.

Although these graft-blend compositions show good impact strengths, they have been found to be relatively difficult to process, possibly because the elastomer becomes cross-linked during the polymerization step or the elastomer is too extensively grafted. A further well known drawback is that the relatively high degree of grafting creates excessive compatibility between the species, preventing development of optimum impact strength, and degrading other physical properties. This problem is further aggravated when residual compatibility-enhancing polar groups, such as chlorine or thiol, remain present in the grafted substrate. A graft-blended composition of vinyl chloride and chlorinated butyl rubber prepared under conditions comparable to those used in preparing the instant butyl rubber-vinyl chloride compositions gave impact strengths of 9 ft-lb/in. of notch vs 21 ft-lb/in. notch for the graft blend of vinyl chloride and butyl rubber of the instant invention.

THE PRESENT INVENTION

It is not possible to foresee the precise properties of graft polymers or the practicality of their preparation a priori, even though a general method of preparation may have been forecast. This is because of the complex nature of the system and the dependence of the product properties on the interactions of many variables. For instance, polymers forming the backbone for grafting have differing solubility parameters, elastomeric and chemical properties, which will affect solubilities, viscosities, dispersion, grafting and melt flow, to mention only a few examples. It has now been unexpectedly discovered that it is possible to prepare a butyl rubber-vinyl chloride graft blend polymer having greatly improved impact strength without degrading other properties by polymerizing vinyl chloride monomer in the presence of butyl rubber by suspension polymerization. This result is completely unexpected because, although the process employed is similar to prior art processes using EPR's, EPDM's, and chlorinated butyl, it is well known that butyl rubber very readily depolymerizes in the presence of high activity free radical catalysts such as those used in the art and employed herein (see, e.g., L. D. Loan, *Journal of Polymer Science*, A2, 2127 (1964)). This is the result of free radical attack on the isobutylene portions of the butyl rubber backbone which is well known to lead to rapid depolymerization. By contrast, neither polyethylene, EPR's, nor chlorinated butyl, are subject to this depolymerization. Further, the unsaturation present in the EPDM's is present in pendant groups rather than in the polymer backbone. Therefore, the depolymerization of any of these prior art elastomers would not be expected to occur in the presence of free radical initiators. Thus, while the prior art elastomers would remain essentially intact in the presence of free radicals and therefore remain capable of performing the function for which they were intended, it would be expected that butyl rubber would rapidly degrade and form an unsuitable material. In fact, British Pat. No. 1,153,937 discloses that attempts to prepare resins by graft polymerizing vinyl chloride to elastomers such as butyl rubber resulted in products having unsatisfactory impact resistance.

The excellent impact enhancement exhibited by vinyl chloride-butyl rubber graft blends prepared according to the instant invention depends on the following fortuitous and unforeseen combination:

(a) during the preparation, a low level of grafting is achieved (<30%, usually <20% of the rubber is grafted)

(b) the butyl rubber is not depolymerized significantly from an impact enhancement viewpoint.

Thus, (a) and (b) are achieved only in the process of the instant invention, and which requires as a key step the addition of the free-radial initiator only when it is desired to initiate the principal polymerization. An attendant advantage of this process is that it permits rubber solvation to be carried out at elevated temperatures without initiating polymerization or causing degradation of the rubber by the initiator.

That such novel results were not previously foreseen in the art is exemplified by British 1,153,937 which prefers addition of the initiator during solvation of the elastomer in the vinyl chloride.

Prior art products based on bottle polymerizations involve comixing of all the various agents at one time, and do not show the steps required to successfully prepare the products of the instant invention. Nor has it been shown that such critical steps were envisaged.

It was also discovered that butyl rubber-vinyl chloride graft blends not only produced impact strengths greater than those achieved using the elastomers of the prior art, but the ease of processability of the products of the instant invention was not reduced as was the case with many prior art compositions. For example, EPDM-polyvinyl chloride graft blend compositions prepared under conditions comparable to those used in preparing the instant butyl rubber-polyvinyl chloride graft blend compositions could not be milled at temperatures below 390° F. and, in some cases, not below 420° F. Pressing temperatures required were 420° F. in all cases. By comparison, the butyl compositions could be milled at temperatures as low as 330° F., but preferably from 350°–370° F. and pressed at temperatures of 350°–390° F. Rheology studies indicated much lower apparent shear stress, and onset of fracture at appreciably higher shear rates for the butyl rubber graft blends than for the EPDM compositions. Melt-flow properties established by rheological measurements are known to indicate the ease of processability of a polymer.

The process employed in the instant invention also yields a product much superior to one prepared by simple milling of butyl rubber and polyvinyl chloride such as shown in U.S. Pat. No. 3,158,664. Appreciably smaller amounts of butyl rubber may be employed in making the graft blends of the instant invention to attain the same impact strengths achieved by the prior art blends. For example, a maximum impact strength of 14 ft-lb/inch of notch were reported for the blends of the prior art. This was obtained using a formulation which consisted of 90 parts vinyl chloride homopolymer and 10 parts of butyl rubber. The instant compositions, using 10 parts of butyl rubber, show impact strengths as high as 21 ft-lb/inch of notch.

Further, versatility of operation using the instant compositions is also much greater than that of the prior art blends. That is, the compositions of the instant invention may be simply fed to a powder blending machine where stabilizers and lubricants are added, prior to fabrication in an extruder, injection molder, or any similar processing equipment, whereas the prior art requires, as a necessary step, that the vinyl chloride homopolymer first be milled for at least 10–15 minutes to incorporate the butyl rubber, or that a Banbury mixing operation be peformed, followed by cutting or pelletizing prior to fabrication. The latter route could be followed, if so desired, with the instant invention but the extra operations are costly and time-consuming.

It was also discovered in comparative tests on PVC milled with butyl rubber of a molecular weight in the range of 1,000 to 100,000, a range within that disclosed by the prior art, that the butyl bleeds out of the mixture with time, resulting in obvious deficiencies. The instant process obviates this problem. Further, in agreement with the prior art (U.S. Pat. No. 3,090,768, it was discovered that mill blends of PVC with butyl rubber in the molecular weight range 1,000–400,000 disclosed in U.S. Pat. No. 3,158,664, are difficult to prepare because of the crumbly nature of the mixture in the early stages of milling. The commercial impracticality of this route was noted from a quality control point of view.

Actually, it is to be expected that there would be significant differences between the products of the instant invention and the prior art butyl rubber blends. The instant products are intimately admixed and involve significant amounts of grafting of the vinyl chloride on the butyl rubber backbone. By contrast, the prior art blends are obtained by simple milling and consequently are much less homogeneous and involve essentially no grafting.

Broadly, the compositions of the instant invention are prepared by polymerizing vinyl chloride monomer in the presence of a butyl rubber by suspension polymerization. The product obtained comprises a minor amount of butyl rubber and, intimately admixed therewith and partially grafted thereto, a major amount of a polyvinyl chloride polymer. By major and minor amount is meant the proportions of butyl rubber measured in parts by weight per 100 parts of vinyl chloride polymer set forth below.

Monomers which are useful in the instant invention include both vinyl chloride and mixtures of vinyl chloride with one or more comonomers such as vinylidene chloride, vinyl acetate, olefins, alkyl vinyl ethers and acrylates, dialkyl fumarates or maleates, unsaturated carboxylic acids, etc. Normally the comonomer will be vinyl acetate. At least about 65% by weight, preferably at least 75%, and most preferably at least 90% of the total monomer concentration, should be vinyl chloride. Therefore, when referring to vinyl chloride monomers and polymers prepared therefrom, it should be understood that both vinyl chloride monomer alone and vinyl chloride monomer together with comonomers such as those mentioned above are intended.

The butyl rubber which may be employed in the practice of this invention is a copolymer containing about 85–99.5%, preferably 95–99.5%, of a $C_4$ to $C_7$ isoolefin, preferably isobutylene, with 0.5 to 15%, preferably 0.5 to 5%, of a $C_4$ to $C_{14}$, preferably $C_4$ to $C_6$, conjugated diolefin. Preferably, the diolefin will be selected from the group consisting of isoprene, butadiene, piperylene, cyclopentadiene, and 2,3-dimethyl butadiene. Because of its ready availability, the most preferred butyl rubber will be the copolymer of isobutylene and isoprene. Other polymers coming within the classification "butyl rubber" for purposes of this invention are those disclosed in U.S. Pat. Nos. 2,577,822, 2,626,940, and 2,671,073, which are incorporated herein by reference.

Useful butyl rubbers are those having a viscosity average molecular weight range of about 1,000 to about 1,200,000. From 0.1 to about 50 parts by weight of these butyl rubbers per hundred parts of total monomers may be employed; preferably about 1 to 40 parts by weight; more preferably about 5 to 30 parts by weight; most preferably 7 to 12 parts, e.g., 10, parts by weight of rubber per 100 parts of total monomer. Both the molecular weight and the formulation to be preferred will, to a large extent, depend upon the properties desired in the final products. Use of the lower molecular weight butyl rubbers, i.e., viscosity average molecular weights of about 1,000 to about 100,000, will result in impact strengths of about 2–3 ft-lbs/inch of notch (as compared to 0.5 ft-lbs/inch of notch for unmodified PVC).

If rigidity of the final product is desired, no more than about 0.1 to about 10 parts, and preferably 0.1 to about 5 parts of the lower molecular weight butyl rubbers per hundred parts of vinyl chloride polymer should be employed. With formulations much above 10 parts, the products become too flexible for rigid applications. This flexibility may, however, be desirable for some applications such as sheets, films, etc.

If both high impact strength and rigidity are to be desired, the higher molecular weight butyl rubber (i.e. 100,000 to about 1,200,000) should be employed. Impact strengths in the range of 20–30 ft-lb/inch of notch are attainable using this molecular weight range. It has been determined that maximum impact strengths occur in the region of about 5 to about 15 parts, preferably 7 to 12 parts, and most preferably about 10 parts, of these higher molecular weight butyl rubbers per hundred parts of the vinyl halide monomer.

The process of the instant invention is also applicable to sulfonated butyl rubbers such as those disclosed in copending application Ser. No. 877,849, now U.S. Pat. No. 3,642,728, incorporated herein by reference.

The term "suspension polymerization" is used herein in its normal sense to mean a process familiar to those skilled in the art, i.e., a process wherein polymerization takes place in a simple physical suspension of drops which coalesce rapidly when agitation ceases. Typically, the butyl rubber is added to the requisite quantity of water (generally 100–250 parts by weight per hundred parts of total monomer charge) in an autoclave. The vinyl chloride charge is then added and the mixture agitated during the solvency step at about 50°–200° F., preferably at 100°–110° F. for 0.5–24 hours, preferably 1–4 hours. The solvation is followed by addition of the suspending agent. The initiator is added when it is desired to initiate polymerization. If initiator is added earlier, the butyl rubber will undergo severe degradation and an unacceptable product will result. Temperature of the system for the desired polymerization is normally about 110°–160° F., and preferably 125°–140° F., and the reaction is allowed to continue, with agitation, until polymerization has reached the desired degree of completion. Reaction duration is comparable to that normally observed in suspension polymerization processes, e.g., 8 to 18 hours. The remaining monomer is then vented off and the resin recovered by centrifuging and drying. Percent yields of polymer will generally be above about 80%.

Alternatively, the butyl rubber is added to the vinyl chloride monomer phase alone at temperatures of 0°–160° F., preferably 70°–100° F., and agitated for a given solvation period, typically 0.5–24 hours, depending on the temperature. Thereafter, sufficient quantities of water (generally 100–250 parts by weight per hundred parts of total monomer charge) containing both suspending agent and free radical initiator are added to the system and immediately heated to the proposed polymerization temperature.

The reaction is preferably run in an oxygen-free atmosphere. The butyl rubber normally employed is uncured, stabilized and in particularly sizes of from $\frac{1}{8}$ inch to 1 inch, and preferably $\frac{3}{8}$ inch to $\frac{3}{4}$ inch. However, for commercial reactors, it is also possible to employ rubber in an unstabilized state or as an emulsion or a latex, or in a partially cross-linked state. These latter two applications have the advantage of reducing handling difficulties normally associated with high tack butyl rubbers.

The suspending agent of choice may be any of those commonly known in the art, such as hydroxy ethyl cellulose, partially hydrolyzed polyvinyl acetate (polyvinyl alcohol), etc., and is normally employed in about 0.05 to about 0.5 parts by weight per hundred parts of vinyl halide monomer, depending on initiator type and quantity and type of butyl rubber employed.

The free radical initiator employed may similarly be any one commonly known to be useful in the art, such as organic peroxides, peresters, and azo-nitrile initiators, e.g., benzoyl, lauroyl, caprylyl, 2,4dichlorobenzoyl, or acetyl-cyclohexane-sulfonyl peroxides, isopropyl, isobutyl, t-butyl cyclohexyl or 2-ethylhexyl peroxydicarbonates, t-butyl peroxy pivalate, azo-bis-isobutyronitrile, and mixtures thereof. The quantity of initiator employed will be varied depending upon the particular process used, the type of butyl rubber used, the quantity of monomer and diluent employed, temperature, etc. Normally, quantities on the order of 0.01 to 0.7 parts per hundred parts of monomer are utilized.

The above process will produce a product in which vinyl chloride polymer is sufficiently grafted to the butyl rubber employed to greatly enhance impact strength while retaining all desirable properties of polyvinyl halide homopolymers. The vinyl chloride polymer may be grafted to from about 0.1 to about 30 wt. % of the total butyl rubber employed. Typically, from about 0.1 to about 20 wt. % of the butyl rubber is grafted with the vinyl chloride polymer.

These graft polymer-containing products may, if desired, by physically blended with other polymer compositions which would normally be incompatible with the polyvinyl halide polymers employed herein. Of course, it would be expected that these graft blends may be physically blended with additional polyvinyl halide homopolymers since the major component of the graft-blend is polyvinyl halide. However, it has also been unexpectedly discovered that additional polymeric materials which are normally incompatible with polyvinyl chloride may also be physically blended therein.

While it is difficult to determine in advance the degree of compatibility of two polymers and while several criteria must be considered (e.g., polarity hydrogen bonding, viscosity, etc.), a good general rule to employ in determining acceptable compatibility of polymers is that they should have solubility parameters ($\delta$) within 0.5 units of one another. In the region of borderline compatibility impact strength is maximized and blendability is adequate. Thus, in the case of PVC ($\delta = 9.5$), materials having solubility parameters $<9$ are generally said to be unacceptable. However, blends of polymers having solubility parameters in the range 7.5-9 with graft blends of the instant invention have been found to exhibit a desirable combination of impact strength and processability. Typical polymers having the required solubility parameters, and thus being useful in the instant invention, include polymers such as butyl rubber, polyethylene, polypropylene, polyisobutylene, polybutene, polybutadiene, polypropylene oxide, butadiene-styrene copolymers, ethylene-propylene copolymers, polyisoprene, neoprene, silicone rubbers, ethylene-propylene-nonconjugated diene terpolymers (EPDM's), etc. Most preferably the polymer to be physically blended will be selected from the group consisting of butyl rubber, EPDM's and polyisobutylene.

Advantages achieved by this method vary with the polymer to be blended. When employing polymers such as higher molecular weight butyl rubber, ethylene-propylene copolymers, EPDM's, higher molecular weight polyisobutylene (e.g., in the range of about 50,000 to about 300,000), polyisoprene, polybutadiene, butadiene-styrene copolymers, etc., further increases in impact strength can be attained. When employing polymers such as lower molecular weight butyls, polyethylene, polypropylene, lower molecular weight polyisobutylene (e.g., in the range of about 5,000 to about 50,000), etc., further enhancement of processability is attained.

Generally, the polymers to be physically blended to the graft-blend may be incorporated in the range of 0.1-20 parts per 100 parts of graft-blend polymer. Preferably, when higher impact strength is desired, about 5-10 parts should be used. If increased processability is desired, the preferably range is 0.5 to 3 parts.

Thus, a graft-blend polymer containing small amounts of lower molecular weight butyl rubber may be prepared and, thereafter, higher molecular weight butyl or other rubbers may be physically blended with the graftblend polymer with much greater ease than would be possible in the purely physical blends shown for the prior art.

As used in the specification and claims, the term "vinyl chloride polymer" means polyvinyl chloride and copolymers of vinyl chloride with other monomers as hereinabove described. The term "total monomers" means the vinyl chloride monomer and any comonomer which may be used in the polymerization.

The invention may be further illustrated by reference to the following examples.

EXAMPLE 1

10 parts by weight of butyl rubber (99.2% isobutylene, 0.8% isoprene) in ¼ inch lumps and having a viscosity average molecular weight of 400,000 were charged to a 10-gallon autocalve. The system was flushed with nitrogen after which 100 parts of vinyl chloride were passed into the autoclave and stirring commenced. Agitation was continued at 80° F. for 24 hours. Then 200 parts of deionized and degassed water, containing 0.4 parts of polyvinyl alcohol and 0.25 parts of caprylyl peroxide, were pressured into the autoclave and the temperature was immediately rapidly increased to 135° F. Polymerization was continued for 9 hours, after which the reactor was cooled, excess monomer vented, and the polymerization product dried in vacuo. 85% yield was obtained.

EXAMPLE 2

5 parts of butyl rubber identical with that used in Example 1, but in ¼ inch lumps, were placed in a 1-gallon autocalve. The procedure was similar to Example 1 except that 0.3 parts of caprylyl peroxide were used. Polymerization was continued for 18 hours and a 78% yield was obtained.

EXAMPLE 3

7.5 parts of butyl rubber identical with that used in Example 1, but in ¼ inch lumps, were placed in a 1-gallon autoclave. The procedure was similar to Example 1 except that 0.4 parts of caprylyl peroxide were used. Polymerization was continued for 6 hours. A yield of 85% was obtained.

EXAMPLE 4

15 parts of butyl rubber identical with that used in Example 1, but in ¼ inch lumps, were placed in a 1-gallon autoclave. The procedure was similar to Example 1 except that 0.5 parts of polyvinyl alcohol and 0.6 parts of caprylyl peroxide were used and the polymerization was continued for 8 hours. 75% yield was obtained.

EXAMPLE 5

20 parts of butyl rubber identical with that used in Example 1, but in ¼ inch lumps, were placed in a 1-gallon autoclave. The procedure was similar to Example 4 except that polymerization was continued for 7 hours. 73% yield was obtained.

EXAMPLE 6

25 parts of butyl rubber identical with that used in Example 1, but in ¼ inch lumps, were placed in a 1-gallon autoclave. The procedure was similar to Example 1 except that 0.5 parts of polyvinyl alcohol and 0.5 parts of caprylyl peroxide were used and polymerization was continued for 7 hours. 79% yield was obtained.

EXAMPLE 7

10 parts of butyl rubber (98% isobutylene, 2% isoprene) in ¼ inch lumps and having a viscosity average molecular weight of 350,000 were charged to a 1-gallon autoclave. The procedure was similar to Example 1 except that 0.4 parts polyvinyl alcohol and 0.5 parts of caprylyl peroxide were used and the polymerization continued for 11 hours. 82% yield was obtained.

EXAMPLE 8

10 parts of butyl rubber (97% isobutylene, 3% isoprene) in ¼ inch lumps and having a viscosity average molecular weight of 350,000 were charged to a 1-gallon autoclave. The procedure was similar to Example 1 except that 0.3 parts of polyvinyl alcohol and 0.5 parts of caprylyl peroxide were used and polymerization continued for 9 hours. 82% yield was obtained.

EXAMPLE 9

5 parts of butyl rubber (96% isobutylene, 4% isoprene) in the form of a very viscous liquid and having a viscosity average molecular weight of 30,000 were charged to a 10-gallon autoclave. The procedure was similar to Example 1 except that 0.3 parts of polyvinyl alcohol and 0.35 parts of caprylyl peroxide were used. Polymerization was carried out for 17 hours and a yield of 71% was obtained.

EXAMPLE 10

10 parts of butyl rubber (96% isobutylene, 4% isoprene) in the form of a very viscous liquid and having a viscosity average molecular weight of 30,000 were charged to a 1-gallon autoclave. The procedure was similar to Example 1 except that 0.4 parts of polyvinyl alcohol and 0.6 parts of caprylyl peroxide were used and polymerization was continued for 13 hours. 68% yield was obtained.

EXAMPLE 11

10 parts of butyl rubber identical with that used in Example 1, but in ¼ inch lumps, were placed in a 1-gallon autoclave. The procedure was similar to Example 1 except that 0.75 parts of hydroxyethyl cellulose were used instead of polyvinyl alcohol, and 0.6 parts of caprylyl peroxide. Polymerization was continued for 5 hours and 83% yield was obtained.

EXAMPLE 12

10 parts by weight of butyl rubber (99.2% isobutylene and 0.8% isoprene) in ½ inch lumps and having a viscosity average molecular weight of 400,000 were charged to a 30-gallon autoclave. 200 parts of deionized water were charged to the autoclave which was then evacuated. 100 parts of vinyl chloride were charged to the autoclave and the mixture was stirred at 100° F. for 4 hours. 0.25 parts of polyvinyl alcohol were added. Then 0.13 parts of caprylyl peroxide were added and the temperature was immediately rapidly increased to 135° F. The polymerization was continued for 11 hours, after which the reactor was cooled, excess monomer vented and the polymerization product dried to vacuo. 88% yield was obtained.

EXAMPLE 13

1 part of a butyl rubber (96% isobutylene, 4% isoprene) in the form of a very viscous liquid and having a viscosity average molecular weight of 30,000 was charged to a 30-gallon autoclave. The procedure was similar to Example 12 except that 0.2 parts of polyvinyl alcohol and 0.12 parts of caprylyl peroxide were used. Polymerization was carried out for 14 hours. 86% yield was obtained.

EXAMPLE 14

10 parts of butyl rubber identical to that used in Example 12 were charged in ¼ inch lumps to a 1-gallon autoclave. The procedure was similar to Example 12 except that 0.3 parts of polyvinyl alcohol and 0.3 parts caprylyl peroxide were used and polymerization was carried out at 129° F. for 10 hours. 83% yield was obtained.

EXAMPLE 15

10 parts of butyl rubber identical to that used in Example 12 were charged in ¼ inch lumps to a 1-gallon autoclave. The procedure was similar to Example 12 except that 0.3 parts of polyvinyl alcohol and 0.4 parts caprylyl peroxide were used. Polymerization was carried out at 121° F. for 15 hours. 81% yield was obtained.

EXAMPLE 16

10 parts of butyl rubber identical to that used in Example 12 were charged in ¼ inch lumps to a 1-gallon autoclave. The procedure was similar to Example 12 except that 0.3 parts of polyvinyl alcohol and 0.65 parts of caprylyl peroxide were used. Polymerization was carried out at 111° F. for 18 hours. 83% yield was obtained.

EXAMPLE 17

200 parts of deionized water were charged to a 1-gallon autoclave, together with 0.2 parts polyvinyl alochol and 0.1 parts caprylyl peroxide. The reactor was flushed with nitrogen and 100 parts of vinyl chloride added. Polymerization was carried out at 135° F. for 8 hours. 84% yield was obtained

EXAMPLE 18

Table I shows the vast improvement in impact strength attainable by the polymers of the instant invention as compared to unmodified PVC. Each of the polymers employed was prepared according to the procedures set forth previously and identified in the tabulation by the pertinent example number. The polymers were processed prior to impact testing under the conditions noted in the tabulation. A general procedure was to mix the polymer by hand with the requisite quantity of stabilizer and lubricant and to mill this mixture on a two-roll mill for 5 minutes. The fluxed material was then sheeted off the mill and cut into pieces suitable for molding into a 1/8 inch thick sheet in a heated press. Total pressing time was 8 minutes. Impact strengths were measured according to the procedure set forth in ASTM D256-56A. Two sets of specimens were prepared according to the following method:

A blend was prepared containing 100 parts polymer, 3 parts of a barium-cadmium soap (Argus Chemical Mark 235), 1 part diphenyl-octyl phosphite, 2 parts octyl epoxy stearate, 10 parts titanium dioxide, 1 part polymethyl methacrylate, 1 part stearic acid. The blend was worked on a 2-roll mill for 5 minutes at the temperature shown and molded at the given temperatures in a press for 8 minutes. A ⅛ inch thick sheet was produced from which impact specimens were prepared.

TABLE I

| Polymer Prepared in Ex. No. | Butyl Rubber M.W. | Butyl Rubber P.H.M. | Polymer (parts) | Stabilizer[1] (parts) | Stearic Acid (parts) | Mill Temp. (° F.) | Press Temp. (° F.) | Impact[2] Strength (ft-lb/inch) |
|---|---|---|---|---|---|---|---|---|
| 2 | 400,000 | 5 | 100 | 3 | 1 | 370 | 390 | 2 |
| 3 | 400,000 | 7.5 | 100 | 3 | 1 | 370 | 390 | 4 |
| 1 | 400,000 | 10 | 100 | 3 | 1 | 350 | 370 | 18 |
| 4 | 400,000 | 15 | 100 | 3 | 0 | 350 | 370 | 1 |
| 5 | 400,000 | 20 | 100 | 4 | 0 | 350 | 370 | 3 |
| 7 | 350,000 | 10 | 100 | 3 | 1 | 350 | 370 | 16 |
| 8 | 350,000 | 10 | 100 | 3 | 1 | 370 | 390 | 18 |
| 1 | 400,000 | 10 | Prep given in Example 18 | | | 360 | 380 | 21 |
| 12 | 400,000 | 10 | Prep given in Example 18 | | | 370 | 385 | 19 |

TABLE I-continued

| Polymer Prepared in Ex. No. | Butyl Rubber M.W. | Butyl Rubber P.H.M. | Polymer (parts) | Stabilizer[1] (parts) | Stearic Acid (parts) | Mill Temp. (° F.) | Press Temp. (° F.) | Impact[2] Strength (ft-lb/inch) |
|---|---|---|---|---|---|---|---|---|
| 17 | — | 0 | 100 | 3 | 1 | 370 | 390 | 0.4 |

[1]Alkyl Tin Mercaptide (Argus Chem. Mark X)
[2]ASTM D256-56A.

From the tabulation it can readily be seen that maximum impact strengths are attained when employing graft-blend polymers prepared with about 10 parts butyl rubber having viscosity average molecular weights in the range of 100,000 to 1,200,000. It is also evident that changes in the mode of polymerization, the degree of unsaturation in the butyl rubber, or the molecular weight of the rubber in the range 100,000–1,200,000 are not detrimental to the impact strength of the plastic.

Table II shows that when graft-blended polymers are prepared from butyl rubbers having viscosity average molecular weights of 1,000–100,000 some impact strength improvement is obtained compared to unmodified PVC.

tents of the two flasks were filtered separately and treated as follows:

(A) Solid residues were found in both filters. That from the raw rubber appeared as unchanged elastomer indicating the insolubility of the rubber in the solvent. The residue from the resin solution was sticky and elastomeric. Pyrolysis gas chromatography confirmed that this was butyl rubber. Further analysis showed the absence of chloride ions.

(B) Filtrate from the resin solution was treated with methanol to precipitate the PVC. The precipitate was filtered-off and the filtrate tested with methanol to confirm that all the PVC had been recovered. The polymer was further washed with methanol and dried in vacuo.

TABLE II

| Polymer Prepared in Ex. No. | Butyl Rubber M.W. | Butyl Rubber P.H.M. | Polymer (parts) | Stabilizer[1] (parts) | Stearic Acid (parts) | Mill Temp. (° F.) | Press Temp. (° F.) | Impact[2] Strength (ft-lb/inch) |
|---|---|---|---|---|---|---|---|---|
| 9 | 30,000 | 5 | 100 | 3 | 1 | 350 | 370 | 3 |
| 10 | 30,000 | 10 | 100 | 3 | 1 | 350 | 370 | 2 |
| 17 | — | 0 | 100 | 3 | 1 | 370 | 390 | 0.4 |

[1]Alkyl Tin Mercaptide (Argus Chem. Mark X).
[2]ASTM D256-56A.

EXAMPLE 19

Rheological data were obtained using an Instron Floor-Model Rheometer. The capillary was 0.05 × 2.0 inches and the temperature was controlled at 180° C. The "Onset of Melt Fracture" was judged by eye from the appearance of the extrudate. Specimens for testing were cut from sheets prepared in the same manner as for impact evaluation.

The data have been displayed in Table III and show the vast improvements in melt flow obtained by the polymers of the instant invention as compared to unmodified PVC.

Pyrolysis gas chromatography indicated the presence of at least 1% butyl rubber associated with the PVC, i.e., at least 10% of the butyl rubber had been grafted.

The filtrate from the raw-butyl rubber extraction was evaporated, but left no residue, confirming the insoluble nature of the butyl rubber.

EXAMPLE 21

All conditions and procedures set forth in Example 13 are repeated, with the only difference being that the monomer employed is a mixture of 96 wt. % vinyl chloride and 4 wt. % vinyl acetate. A similar polymer yield is obtained.

TABLE III

| Polymer Prepared in Ex. No. | Butyl Rubber M.W. | Butyl Rubber P.H.M. | Mill[1] Temp. (° F.) | Press Temp. (° F.) | Shear Rate 7.5 Shear | Shear Rate 30 Stress | (sec$^{-1}$) 75 (psi) | Onset of Fracture (sec$^{-1}$) |
|---|---|---|---|---|---|---|---|---|
| 13 | 30,000 | 1 | 350 | 370 | 23 | 35 | 53 | >3000 |
| 9 | 30,000 | 5 | 350 | 370 | 11 | 23 | 36 | >3000 |
| 10 | 30,000 | 10 | 350 | 370 | 5 | 13 | 21 | >3000 |
| 2 | 400,000 | 5 | 370 | 390 | 25 | 37 | 45 | 30 |
| 3 | 400,000 | 7.5 | 370 | 390 | 22 | 34 | 42 | 75 |
| 1 | 400,000 | 10 | 350 | 370 | 24 | 40 | 46 | >3000 |
| 17 | — | 0 | 370 | 390 | 110 | 132 | 144 | <3 |

[1]Formulation consisted of 100 parts polymer, 3 parts Alkyl Tin Mercaptide (Argus Chemical Mark X), 1 part Stearic Acid.

EXAMPLE 20

20 grams of a resin, prepared similarly to Example 1 but containing 9 parts of butyl rubber (99.2% isobutylene, 0.8% isoprene) having a viscosity average molecular weight of 400,000 were placed in a flask together with 150 ml. purified cyclohexanone. In a separate flask were placed 5 grams of a rubber identical with that used in the preparation of the graft-blend polymer, together with 150 ml. purified cyclohexanone. Both flasks were shaken for 16 hours on a mechanical shaker. The con- Comparative Examples 22 and 23 below are directed to polymers prepared employing EPDM rubbers

EXAMPLE 22

5 parts by weight of an EPDM rubber (55% ethylene, 42.4% propylene, 2.6% norbornene) and having a Mooney Viscosity (ML 1 + 8 min.) at 260° F. of 62, in the form of ¼ inch lumps, were placed in a 1-gallon autoclave. The system was flushed with nitrogen after which 100 parts of vinyl chloride were passed into the autoclave and stirring commenced. Agitation was continued at 80° F. for 24 hours. Then 200 parts of deionized water containing 0.4 parts of polyvinyl alcohol and 0.5 parts of caprylyl peroxide were pressured into the autoclave. The temperature was then immediately increased rapidly to 135° F. Polymerization was continued for 6 hours, after which the reactor was cooled, excess monomer vented, and the polymerization product dried in vacuo. 72% yield was obtained.

EXAMPLE 23

A polymer was prepared similarly to Example 22 except that 10 parts of an EPDM rubber (55% ethylene, 41.7% propylene, 3.3% norbornene) and having a Mooney Viscosity (ML 1 + 8 min.) at 212° F. of 40, were used, together with 0.6 parts of caprylyl peroxide. The polymerization was carried out for 11 hours and a 78% yield was obtained.

Data presented in Table IV show the preparative conditions for the specimen sheets and the impact strengths obtained. The specimens of the polymers containing EPDM rubbers could not be satisfactorily prepared at temperatures less than those shown.

TABLE IV

| Polymer Prepared in Ex. No. | EPDM (PHM) | Chlorinated Butyl (PHM) | Butyl (PHM) | Mill[(1)] Temp. (° F.) | Press Temp. (° F.) | Impact Strength (Ft-Lb/inch) |
| --- | --- | --- | --- | --- | --- | --- |
| 22 | 5 | — | — | 390 | 420 | 2 |
| 23 | 10 | — | — | 390 | 420 | 13 |
| 8 | — | — | 10 | 350 | 370 | 18 |
| 31 | — | 10 | — | 370 | 390 | 9 |

[(1)]General specimen preparation given in Example 18 formulation contained 100 parts polymer, 3 parts Alkyl Tin Mercaptide (Argus Chemical Mark X), 1 part Stearic Acid.

In Table V are presented rheological data for a polymer prepared from an EPDM rubber. Test conditions were the same as those used in establishing data presented for graft-blend polymers of the instant invention presented in Table III.

TABLE V

| Polymer Prepared in Ex. No. | EPDM (PHM) | Chlorinated Butyl (PHM) | Butyl (PHM) | Mill Temp (° F) | Press Temp (° F) | Shear Rate ($sec^{-1}$) | | | Onset of Fracture ($sec^{-1}$) |
| --- | --- | --- | --- | --- | --- | --- | --- | --- | --- |
| | | | | | | 7.5 Shear | 30 Stress | 75 (psi) | |
| 22 | 5 | — | — | 390 | 420 | 53 | 77 | 103 | <3 |
| 2 | — | — | 5 | 370 | 390 | 25 | 37 | 45 | 30 |
| 31 | — | 10 | — | 370 | 390 | — | — | — | <3 |

Comparative Data on Dry Blends, Examples 24 and 25

EXAMPLE 24

A mixture of 100 parts of PVC prepared in Example 17, 3 parts of a tin mercaptide stabilizer (Argus Chemical Mark X) and 1 part of stearic acid was made. This blend was placed on a two-roll mill at a roll temperature of 350° F. When a rolling bank of fluxed material had formed, 10 parts of a butyl rubber (99.2% isobutylene, 0.8% isoprene) and having a viscosity average molecular weight of 400,000, in the form of 1/16 inch pieces, was added slowly to the mill. Addition of the elastomer caused excessive crumbling and after milling for 10 minutes, the mixture was sheeted off. The sheet was cut and molded at 370° F. in a press to form a ⅛ inch sheet. The sheet had a poor surface appearance. An impact test by procedure ASTM D256-56A gave a value of 0.4 ft-lb/inch notch.

EXAMPLE 25

A mixture of 100 parts of PVC prepared in Example 17, 3 parts of a tin mercaptide stabilizer (Argus Chemical Mark X) and 1 part of stearic acid was made. This blend was placed on a two-roll mill at a roll temperature of 350° F. The mixture was fluxed for 1 minute and then 1 part of a butyl rubber (96% isobutylene, 4% isoprene) in the form of a very viscous liquid and having a viscosity average molecular weight of 30,000 was added. Some crumbling was evident in the milled material, but a homogeneous melt appeared to have been formed after 10 minutes milling. The mixture was sheeted off and cut into pieces which were molded in a press at 370° F. to give a ⅛ inch thick sheet. The surface of the sheet was sticky showing exudation of the added incompatible elastomer. This did not occur when preparing specimens from the graft-blend polymers produced in Examples 9, 10 and 13; these graft-blends contained 5 parts, 10 parts, and 1 part, respectively, of an identical rubber.

EXAMPLE 26

A resin was prepared similarly to Example 1, except that 9 parts of butyl rubber (99.2% isobutylene, 0.8% isoprene) having a viscosity average molecular weight of 400,000 were used. 50 parts by weight of the above resin was blended in a Papenmeier Mixer with 50 parts of PVC homopolymer (prepared similarly to Example 17), 3 parts of an alkyl-tin mercaptide stabilizer (Argus Chemical, Mark X), and 1 part of stearic acid. The blend was charged to a two-roll mill having a roll temperature of 350° F. After a rolling bank had been formed, 5 parts were added to the mill of a butyl rubber (99.2% isobutylene, 0.8% isoprene) having a viscosity average molecular weight of 400,000, and cut into small pieces. Milling was continued for 5 minutes after the addition of the rubber. The fluxed material was sheeted off the mill and cut into pieces suitable for molding into a ⅛ inch thick sheet in a heated press. Total pressing time was 8 minutes at 370° F. The molded sheet had a homogeneous, shiny appearance, without evidence of incompatibility or exudation. An impact strength of 18 ft-lb/inch notch was measured on the sheet by ASTM D256-56A.

EXAMPLE 27

An example similar to Example 26 was carried out, except that the raw rubber added to the fluxed blend on the mill was 4 parts of an EPDM rubber (74% ethylene, 22.8% propylene, 3.2% norbornene) having a Mooney Viscosity (ML 1 + 8 min.) at 260° F. of 55. The ease of milling was excellent with no evidence of incompatibility; exudation was not evident from the pressed sheet.

EXAMPLE 28

The compounds of the instant invention have numerous uses such as extruded profiles, sheets molded objects, films, coatings, and siding. When used as in siding or other exterior profile applications, these materials show exceptional weathering properties.

A resin was prepared, Example 1, containing 90 parts PVC and 10 parts of butyl rubber (99.2% isobutylene, 0.8% isoprene) having a viscosity average molecular weight of 400,000. 100 parts by weight of this resin were blended in a Papenmeier Mixer with 3 parts of a barium-cadmium soap (Argus Chemical Mark 235), 1 part diphenyl-octyl phosphite, 2 parts octyl epoxy stearate, 12 parts titanium dioxide, 1 part polymethyl methacrylate, 1 part stearic acid. This blend, designated A, was worked on a 2-roll mill for 5 minutes at 370° F., then sheeted-off in a sheet 55 thou. thick. Specimens 2 × 2 inches were cut for weathering-test exposures.

A blend (designated B) was prepared as above but containing 100 parts of a PVC homopolymer prepared similarly to that in Example 17, i.e., containing no graft-blend polymers.

Accelerated weathering tests of a standard type, and standard outdoor exposure tests are tabulated below. The data confirm that polymers of the instant invention have excellent stability and are superior in this respect to unmodified PVC.

Accelerated Tests:

| Test Type | CHANGE IN YELLOWNESS INDEX | | | | | |
|---|---|---|---|---|---|---|
| | Emmagua Arizona | | Carbon Arc Fadeometer | | | |
| Test Duration | 72 days | 200 hrs. | 400 hrs. | 600 hrs. | 800 hrs. | 1000 hrs. |
| Blend A | −0.61 | −0.89 | −0.39 | −0.45 | −0.33 | +0.17 |
| Blend B | +0.51 | −0.93 | +2.16 | +2.59 | +2.67 | +4.71 |

Outdoor Tests:

| Test Type | CHANGE IN YELLOWNESS INDEX | |
|---|---|---|
| | Arizona 45° S | Miami 45° S |
| Test Duration | 2 months | 2 months |
| Blend A | −0.85 | −0.31 |
| Blend B | +0.13 | +0.70 |

Yellowness Index (Y.I.) measurements were conducted according to procedure ASTM D1925-63T. A positive change in Y.I. indicates that the exposed specimen is yellower than an unexposed sample of the same material used as a standard. Large positive changes are obviously undesirable. Conversely, a negative change indicates that the exposed sample has become bluer than the standard which is not normally considered to be a problem.

EXAMPLE 29

10 parts of a sulfobutyl rubber having a viscosity average molecular weight of 300,000 and containing 0.23 mole % SO₃Na, in the form of ¼ inch lumps, was placed in a 1-gallon autoclave. A procedure similar to Example 1 was followed except that 0.4 parts of polyvinyl alcohol and 0.5 parts of caprylyl peroxide were used. The polymerization was carried out for 17 hours. The product was recovered and dried under vacuum.

EXAMPLE 30

The same procedure as shown in Example 29 was followed except that the rubber contained 0.63 mole % SO₃Na. The level of suspending agent was 0.3 parts polyvinyl alcohol and 0.6 parts of caprylyl peroxide. The polymerization was carried out for 10 hours.

Impact evaluations for resins of Examples 29 and 30 were obtained as follows:

The resins were treated separately by a blend of 100 parts resin with 1 part of Mark X stabilizer and 1 part stearic acid milled on two-roll mill for 8 minutes at 370° F. The milled sheet was pressed into ⅛ inch thick plaque at 390° F. under 20,000 lb. pressure. Izod impact strengths were as follows:

Resin of Example 29 - 16 ft. lb./inch notch
Resin of Example 30 - 14 ft. lb./inch notch Comparative Example 31 is directed to polymers prepared using chlorinated butyl rubber.

EXAMPLE 31

10 parts by weight of a chlorinated butyl rubber (Enjay Butyl HT 10-66, chlorine content 2.8% by weight) in the form of ¼ inch lumps was placed in a 1-gallon autoclave. The system was flushed with nitrogen, after which 100 parts of vinyl chloride was pressured into the autoclave, and stirring commenced. Agitation continued at 80° F. for 24 hours. Then 200 parts deionized water containing 0.4 parts polyvinyl alcohol and 0.4 parts caprylyl peroxide were pressured into the autclave. The reaction was rapidly heated to 135° F. and polymerization continued for 7½ hours, after which the reactants were cooled, excess monomer vented, and the polymerization product dried in vacuo. 84% yield was obtained.

Data presented in Table IV shows that the impact strength of this polymeric material was inferior to that of a similarly prepared sample of butyl rubber - vinyl chloride graft blend. The rheological data presented in Table V also show that the processability is inferior, since the onset of melt fracture is very low.

While these examples adequately illustrate the invention, it should be understood that the present invention in its broadest aspects is not necessarily limited to the specific materials, conditions and procedures shown therein. The present invention is limited only by the claims which follow.

What is claimed is:

1. In a water base suspension polymerization process for preparing an improved impact-resistant vinyl chloride polymer, the improvement which consists essentially of adding a monomer comprising at least about 65% vinyl chloride to a reaction zone containing about 0.1 to about 50 parts by weight per 100 parts of said monomer of uncured butyl rubber having a viscosity average molecular weight of 100,000 to 1,200,000 and thereafter introducing a polymerization initiator and polymerizing, whereby there is obtained polymer blend comprising uncured butyl rubber, vinyl chloride polymer and uncured butyl rubber having grafted thereon vinyl chloride polymer.

2. The process of claim 1 wherein about 5 to about 30 parts by weight of uncured butyl rubber is used.

3. The process of claim 1 wherein about 7 to 12 parts by weight of uncured butyl rubber are used 4. The process of claim 1 wherein the polymerization initiator is a free radical catalyst.

5. The process of claim 1 wherein the polymer to be produced is a homopolymer of vinyl chloride.

6. The process of claim 1 wherein the polymer to be produced is a copolymer of vinyl chloride with at least one second monomer selected from the group consisting of vinyl acetate, vinylidene chloride, alkyl vinyl ethers, acrylates, fumarates, and maleates.

7. The process of claim 1 wherein the second monomer is vinyl acetate.

8. The product prepared by the process of claim 1.

9. The product prepared by the process of claim 1.

10. The product prepared by the process of claim 7.

* * * * *